UNITED STATES PATENT OFFICE.

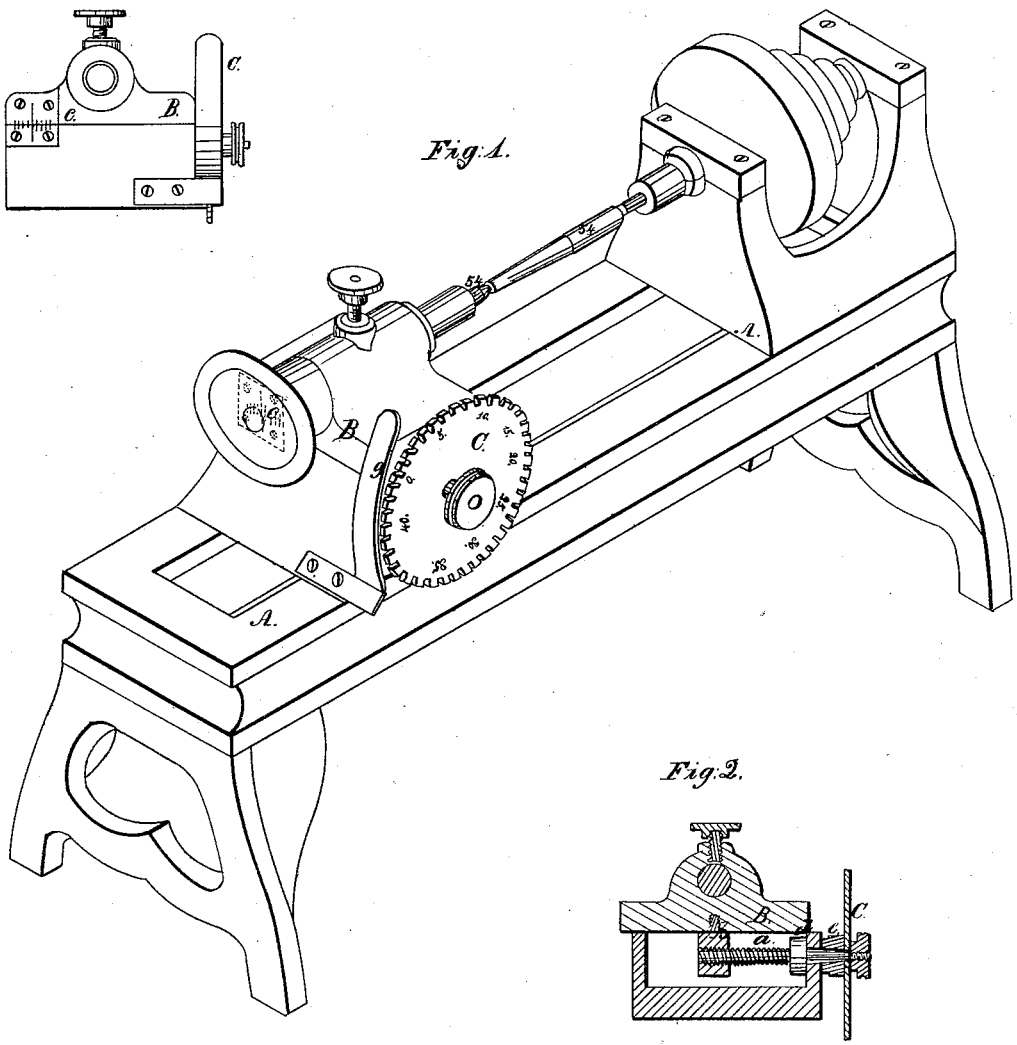

ANSON HATCH, OF NEW HAVEN, CONNECTICUT, ASSIGNOR TO HIMSELF AND JOHN PARKER LINDSAY, OF SAME PLACE.

IMPROVEMENT IN LATHES.

Specification forming part of Letters Patent No. 53,374, dated March 20, 1866.

*To all whom it may concern:*

Be it known that I, ANSON HATCH, of the city and county of New Haven, in the State of Connecticut, have invented a new and useful Improvement in Apparatus to be attached to Engine-Lathes for Turning Tapers; and I do hereby declare that the following is a full, clear, and exact description of the construction, character, and operation of the same, reference being had to the accompanying drawings, which make part of this specification, in which—

Figure 1 is a perspective view of the lathe bench or frame, with the two heads, centers, &c., showing the index-wheel, graduated scale, &c. Fig. 2 is a section of the head, &c., cut through center, showing the connection between the index-wheel and the sliding portion of the movable head. Fig. 3 is a plan of the head, viewed in the direction of the length of the lathe, showing the graduated scale, &c.

My improvement consists in attaching to the sliding portion of the head an index-wheel by means of a screw, the threads of which are graduated, as ten or twenty to the inch, and the periphery of the index-wheel cut with fifty or one hundred spaces or notches, so that their multiple or product will be one thousand, and therefore each space or notch in the wheel will represent one-thousandth of an inch, and each revolution of the index-wheel will be equal to one thread of the screw, and will be indicated on the graduated scale, as in Fig. 3.

I make or use any ordinary engine-lathe, with all of its parts in the usual form, as shown at A A, Fig. 1, except, instead of two screws or other devices, as now used, to move and adjust the head for turning a taper, I use one screw, as shown at *a*, tapered into the projecting nut *b* on the under side of the movable portion B of the head, and I fit on an index-wheel, as C, and a scale, as *c*, Fig. 3, to indicate the exact extent to which the head, and consequently the center, is moved laterally.

I secure the nut *b*, Fig. 2, to the movable portion B of the head by screwing it in, as indicated in section in Fig. 2, or I cast it in one piece with it, or I secure it by any other convenient means.

I make the screw *a*, Fig. 2, with twenty threads to the inch, and the index-wheel C, Fig. 1, with fifty notches or spaces, as shown in Fig. 1; or I make the screw with ten threads to the inch and the index-wheel with one hundred notches or spaces, for convenience—that is, so that the multiple or product of the two will be one thousand, so that each notch or space in the index-wheel will represent one-thousandth of an inch, and I make the graduated scale *c*, Fig. 3, to correspond with the screw, so that it will show the number of times the index-wheel has been revolved. On the screw *a* I turn or fit a suitable collar, as *d*, and on the index-wheel I fit a collar, pipe, or socket, as *e*, Fig. 2, so close as to prevent any end chase, so that the lateral movement of the center may be with entire accuracy.

Having made and fitted the parts, as before described, with the screw *a* in the nut *b*, and the index-wheel C on its continuation, I bring the projecting point *g* to the notch or space *o* on the index-wheel C, when, if the parts of the long or central mark in the graduated scale correspond, the lathe will be in a condition to turn a perfect parallel. Then, if I wish to turn a taper of fifty-four thousandths of an inch in one inch in length, I revolve the index-wheel one-half that number—to wit, to the space twenty-seven—and put the lathe in operation, when it will produce that exact taper, and the same for any other length; and when I desire to restore the lathe to its position for turning straight or parallel I have only to bring the *o* on the index-wheel to the index-point, which brings it exactly right.

If I want a taper of more than one hundred thousandths, when I use the index-wheel of fifty spaces I give the wheel one complete turn, (which carries it the distance of one thread of the screw,) and then the balance toward another revolution, and so on, and for all other proportions in the same way, which will be readily understood.

What I claim as my invention, and desire to secure by Letters Patent, is—

The index-wheel C, in combination with a screw, as *a*, and a graduated scale, as *c*, when the whole is constructed, arranged, and fitted to produce the result substantially as herein described.

ANSON HATCH.

Witnesses:
  CHAS. B. BRISTOL,
  R. FITZGERALD.